United States Patent [19]
Smalley

[11] Patent Number: 6,155,313
[45] Date of Patent: Dec. 5, 2000

[54] TIRE EVACUATION AND INFLATION APPARATUS AND METHOD

[75] Inventor: William R. Smalley, Topeka, Kans.

[73] Assignee: Beverly Smalley, Topeka, Kans.; a part interest

[21] Appl. No.: 09/418,226

[22] Filed: Oct. 14, 1999

Related U.S. Application Data

[63] Continuation-in-part of application No. 09/036,135, Mar. 6, 1998, Pat. No. 5,967,198.

[51] Int. Cl.$^7$ .................................................. B65B 31/00
[52] U.S. Cl. .................................. 141/38; 141/4; 141/39; 141/47; 141/48; 141/65; 141/66; 141/82; 141/94; 141/95; 141/311 R; 141/313; 141/382; 152/415; 152/429
[58] Field of Search .................................. 141/4, 38, 39, 141/47–49, 65–67, 82, 94, 95, 100, 103–105, 311 R, 313, 382; 152/415, 427, 429

[56] References Cited

U.S. PATENT DOCUMENTS

| | | |
|---|---|---|
| 2,235,510 | 3/1941 | Watrous, Jr. . |
| 3,498,341 | 3/1970 | Spereberg . |
| 4,513,803 | 4/1985 | Reese . |
| 4,813,268 | 3/1989 | Helvey ........................................ 73/40.7 |
| 5,181,977 | 1/1993 | Gneiding et al. . |
| 5,417,900 | 5/1995 | Martin, Sr. . |
| 5,878,791 | 3/1999 | Kane .......................................... 141/59 |
| 5,906,227 | 5/1999 | Sowry . |

*Primary Examiner*—Henry J. Recla
*Assistant Examiner*—Timothy L. Maust
*Attorney, Agent, or Firm*—Shughart Thomson & Kilroy P.C.

[57] ABSTRACT

A tire inflation apparatus and method involves first evacuating a seated pneumatic tire using a vacuum pump and then inflating the tire with a dried inert gas under pressure without allowing any ambient air to reenter the evacuated tire. The apparatus includes a three way valve which is connected by a first conduit to a tank of pressurized inert gas and by a second conduit to the vacuum pump. A hose having a tire valve chuck connected to a distal end is connected at the opposite end from the chuck to the three way valve. The three way valve selectively and alternatively flow connects the hose to the tank of pressurized gas or the vacuum pump through the first or second conduits respectively. The hose is initially connected to the vacuum pump to evacuate the tire, and then to the tank of pressurized gas to inflate the tire. A heater on the first conduit heats the cooled gas exiting the tank to raise the temperature of the pressurized gas delivered to the tire at least to the ambient temperature.

8 Claims, 4 Drawing Sheets

TIRE EVACUATION AND INFLATION APPARATUS AND METHOD

CROSS REFERENCE TO RELATED APPLICATIONS

This application is a continuation-in-part of application Ser. No. 09/036,135, now U.S. Pat. No. 5,967,198, filed Mar. 6, 1998, and entitled TIRE EVACUATION AND INFLATION APPARATUS AND METHOD.

BACKGROUND OF THE INVENTION

1. Field of the Invention

This invention relates to a tire inflation apparatus and method, and, more particularly, to such a method in which pneumatic tires are first evacuated via a vacuum pump and then inflated with a purified, dried gas under pressure, such as pressurized nitrogen without allowing any ambient air to reenter the evacuated tire.

2. Description of the Related Art

Pneumatic tires for automobiles, aircraft and other vehicles have traditionally been inflated by compressed ambient air. Compressed air works generally well with bicycle tires, tractor tires and even standard automobile tires run at relatively low speeds where exacting tire balance and consistent tire pressure is not critical. In the case of uses such as race cars, dragsters, and high altitude aircraft, compressed ambient air is not a satisfactory medium for inflating tires for a variety of reasons. When compressed air is introduced into a tire via a compressor open to the ambient atmosphere, water vapor and other impurities are introduced into the tire in the same proportions as they occur in the ambient air. With all of the moisture and other impurities present, air volume in the tire fluctuates fairly widely with temperature, particularly due to the moisture changing from liquid to vapor form and vice-versa as temperatures in the tire change. As a rule of thumb, the pressure of the air in tires inflated with compressed ambient air will change about 1 psi for every 10 degree Fahrenheit change in temperature. Thus, a tire inflated at 60 degrees Fahrenheit will be substantially under inflated at 20 degrees due to the combined effects of temperature in reducing gas pressure and moisture condensing out of the air within the tire. Conversely, as temperatures increase to 90 degrees Fahrenheit, the tire will be substantially overinflated due to the water being vaporized and the attendant increase in air pressure due to temperature. These under or over inflation conditions can adversely affect rolling friction of tires on pavement, thus decreasing gas mileage. Tire wear is also substantially increased when tires are not inflated to the manufacturer's recommendations. Water vapor within tires can also induce rust within steel belted radials, which further reduces tire life. Furthermore water vapor introduced into a tire in a high altitude jet airplane, for example, will condense and then freeze and form ice crystals which generally fall to the bottom of the tire as it lies stationary in the wheel well of the airplane. When the airplane lands, the ice crystals can create a substantial imbalance in the tire, which must accelerate virtually instantly from rest to 150 or more miles per hour. As the tire accelerates, the ice crystals are thrown around the rolling tire by centrifugal force, leading to further imbalance, increasing internal wear, and also increasing the likelihood of tire blow-outs. In the case of race cars and dragsters, since the water vapor introduced into the tire condensed and vaporizes at unpredictable times, condensed water within the tire lags behind the column of air within the tire as the tire is rapidly accelerated. It is believed by the inventor that this is the cause of much of the "tire chatter" which is such a problem in dragsters and other racing cars, as water within the tire drags relative to the tire rotation, the tire becomes unevenly pressurized around its perimeter, thus inducing up and down movement or chatter. Furthermore, as the race car tires spin at high speed, considerable heat builds up in the tires themselves thus considerably increasing the internal tire pressure due to the expansion of the water vapor.

In order to eliminate these problems, race car owners, space shuttle transport vehicles, earthmoving and mining equipment and commercial and military high altitude aircraft often inflate their tires with compressed nitrogen or other generally unreactive and non-combustible gasses such as argon or sulfur hexafluoride. Nitrogen is an ideal gas for such a purpose since it is chemically unreactive, non-combustible, non-flammable and non-corrosive, and, when dry, is relatively stable in volume through a wide range of temperatures. For example, the specific volume of a quantity of dry nitrogen gas at 1 atmosphere of pressure varies less than 13% in a range of −10 degrees F. to +116 degrees F. Thus, the use of nitrogen to inflate a pneumatic tire offers a large reduction in fluctuations of internal tire pressure due to temperature variations over those which occur when moisture laden compressed ambient air is used. Furthermore, since nitrogen is stored in pressurized tanks under controlled conditions, the nitrogen gas can be dried and purified as it is placed into the tank, thus minimizing moisture and other impurities transferred into the tire.

However, when new or repaired tires are first placed on a wheel, they must be inflated under high pressure to get the tire bead to seat on the wheel rim. In order to accomplish this, even in race car and high altitude aircraft tires, compressed ambient air is used. Once the tire is inflated and properly seated on the wheel rim, the compressed air is bled off via the tire's Schrader spring loaded valve and a source of compressed nitrogen is then attached to the tire valve and the tire is reinflated. With this method, the tire's internal pressure is simply returned to ambient pressure before being filled with nitrogen. This leaves a quantity of air at ambient pressure in the tire which air quantity, at ambient pressure, is equal to the internal volume of the tire. Along with the quantity of air left in the tire, moisture and other gaseous impurities are present in the tire in the same proportion as they are found in the ambient atmosphere. When the dry, purified nitrogen is introduced into the tire under pressure, it mixes with the air, moisture and other impurities already present in the tire as the tire is being inflated. The inflated tire is thus filled with a quantity of air including attendant moisture and other impurities and a larger quantity of nitrogen, thus repeating, albeit at a reduced level, the problems associated with the use of ambient compressed air.

It is clear, then that a need exists for a tire inflation apparatus and method which avoids these problems of the prior art. Such a tire inflation apparatus should preferably inflate tires with compressed, purified and dried gas, such as nitrogen, to the manufacturer's recommended tire pressure while minimizing or eliminating moisture and other impurities in the tire.

SUMMARY OF THE INVENTION

The present invention is directed to a tire inflation apparatus and method in which tires are initially inflated with compressed, ambient air to seat their bead on a wheel rim. The inflated tire is then evacuated and reinflated with dried, purified gas, such as nitrogen, under pressure. The apparatus includes a source of pressurized, dried and purified gas, such as nitrogen, and a vacuum pump attached to two outer legs of a three way ball valve. A middle leg of the three way ball valve is attached to a length of supply hose terminated by a check valve which, in turn, can be attached to the valve stem of a deflated, seated tire to open the Schrader valve of the deflated tire. The three way valve is then turned to connect the vacuum pump to the supply hose and the vacuum pump is started. The air remaining in the tire is thus evacuated by the vacuum pump as a near total vacuum, depending upon tire design, is drawn on the tire. A vacuum gauge and a micron gauge are attached in parallel with the vacuum pump so the amount of air remaining in the tire can be monitored. When a sufficient vacuum is drawn on the tire, as measured by the vacuum and micron vacuum gauges, the three way ball valve is turned to detach the vacuum pump from the supply line and to connect the pressurized gas source to the supply line. The vacuum pump can then be shut off. A regulator valve on the source of pressurized gas is set to supply the required amount of pressure to the evacuated tire, reinflating the tire with purified, dried gas, such as nitrogen. The evacuated tire is thus inflated by the pressurized gas source to the manufacturer's recommended tire pressure, as monitored by the regulator valve, thus yielding a tire which is inflated solely with a purified, dried gas, such as nitrogen.

Due to the large pressure drop of the pressurized gas passing through the regulator valve, the temperature of the pressurized gas drops considerably. The pressurized gas passes through a heater on a supply line connecting the source of pressurized gas to the three way valve. The pressurized gas is preferably heated to at least ambient temperature and preferably as close as possible to the running temperature which the gas in the tires will reach during operation of the vehicle. Raising the temperature of the pressurized gas supplied to the tire helps ensure proper inflation of the tires at an optimum temperature to reduce the problems of over or under inflation of the tires during changing operating conditions for the tires.

OBJECT AND ADVANTAGES OF THE INVENTION

The objects and advantages of the present invention include: providing a tire evacuation and inflation apparatus and method; providing such a method and apparatus which allows tires to be inflated solely with a generally chemically inert or unreactive gas such as nitrogen, argon or sulfur hexafluoride; providing such a method and apparatus in which tires first have their beads set on wheel rims via compressed air before being evacuated and then filled with pressurized generally inert gas; providing such an apparatus and method in which a three way valve has a middle leg attached to a supply hose which terminates in a check valve, a first outer leg attached to a vacuum pump and a second outer leg attached to a source of pressurized generally inert gas; providing such an apparatus and method in which a tire can be first evacuated and then inflated with nitrogen without removing the supply hose from the tire; providing such an apparatus and method in which a vacuum gauge and/or a micron gauge monitors the air remaining in the tire to insure substantially complete evacuation; providing such an apparatus and method which enhances the safety, efficiency and longevity of pneumatic tires; and providing such a method and apparatus which is particularly well adapted to its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
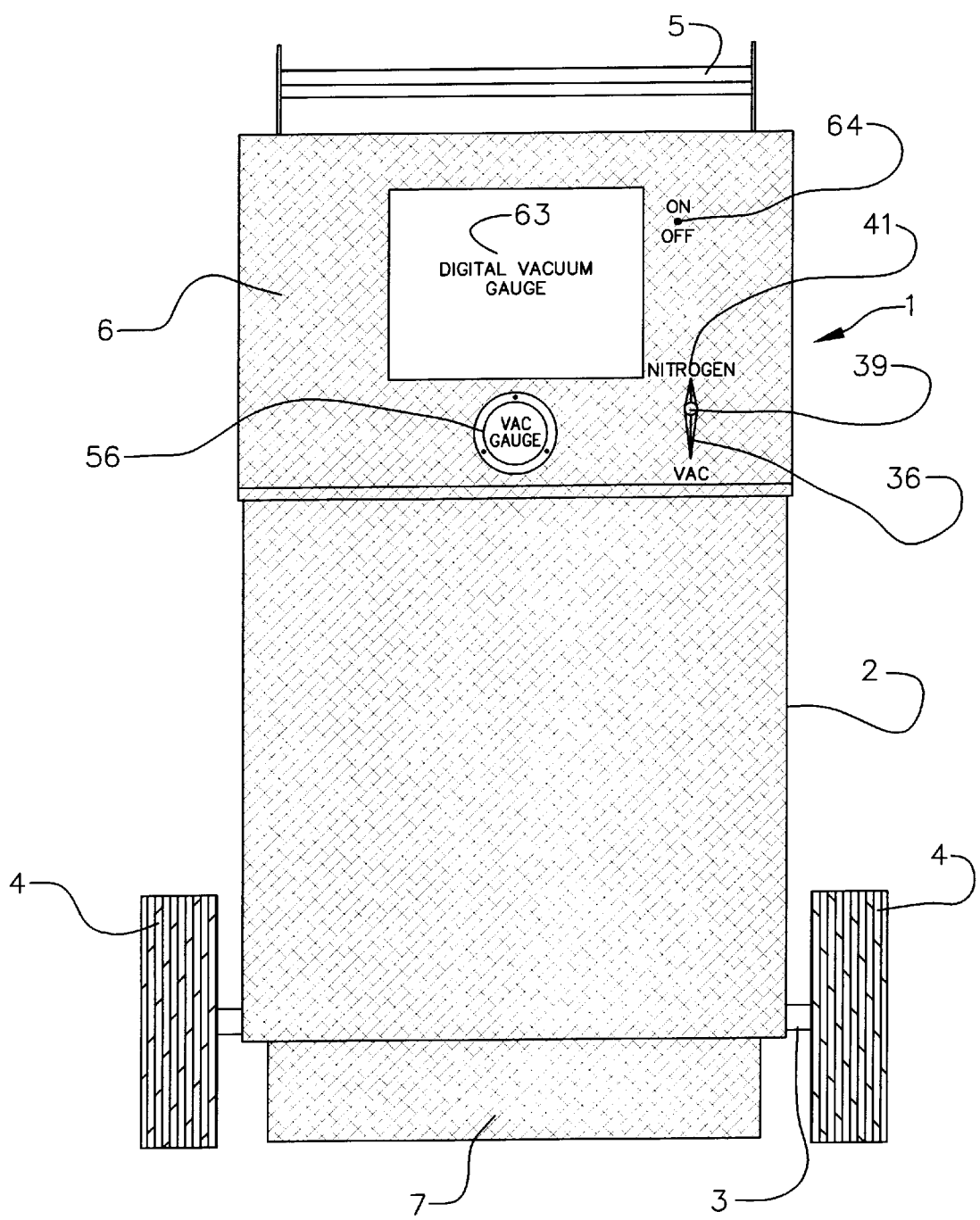
FIG. 1 is a front elevational view of a tire evacuation and inflation apparatus in accordance with the present invention.
Figure 2:
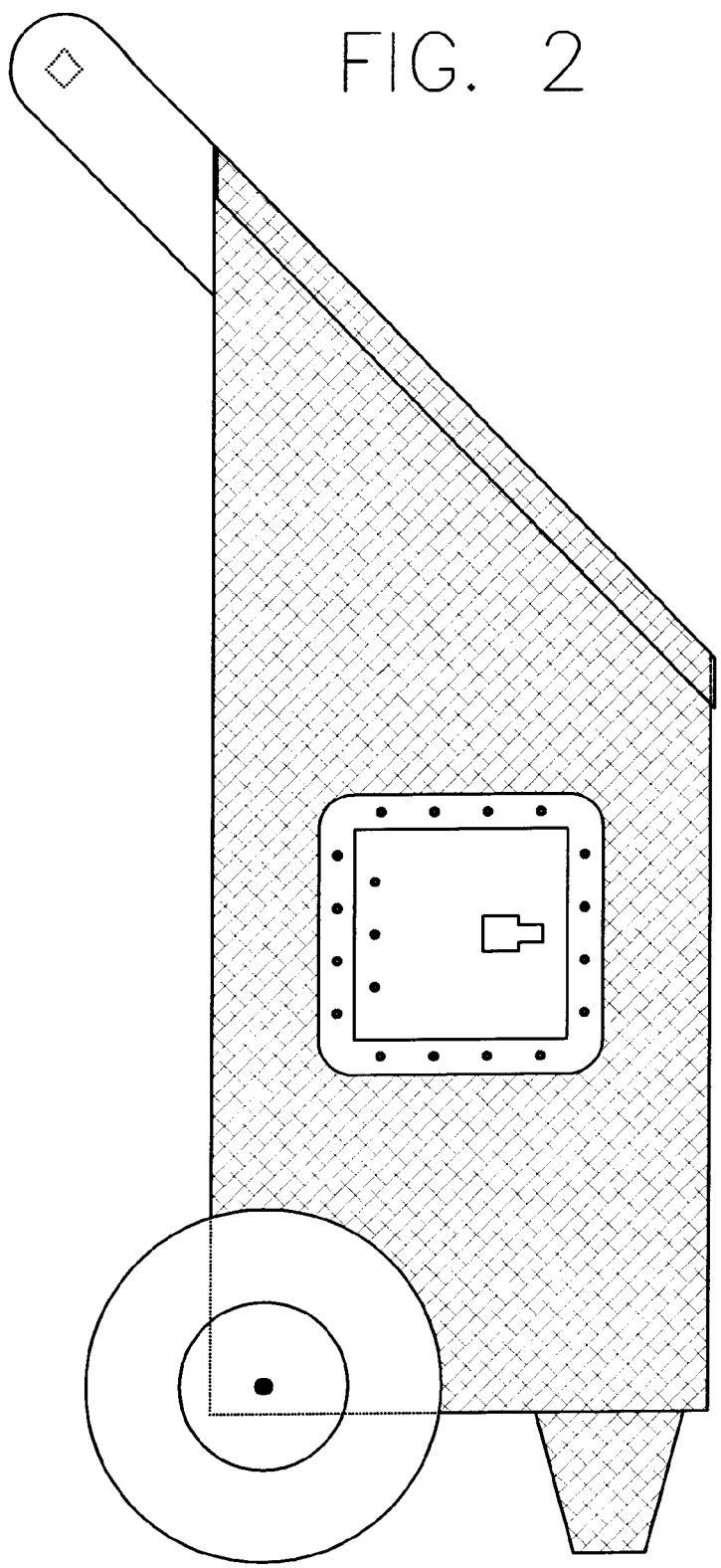
FIG. 2 is a side elevational view of a tire evacuation and inflation apparatus of FIG. 1.
Figure 3:
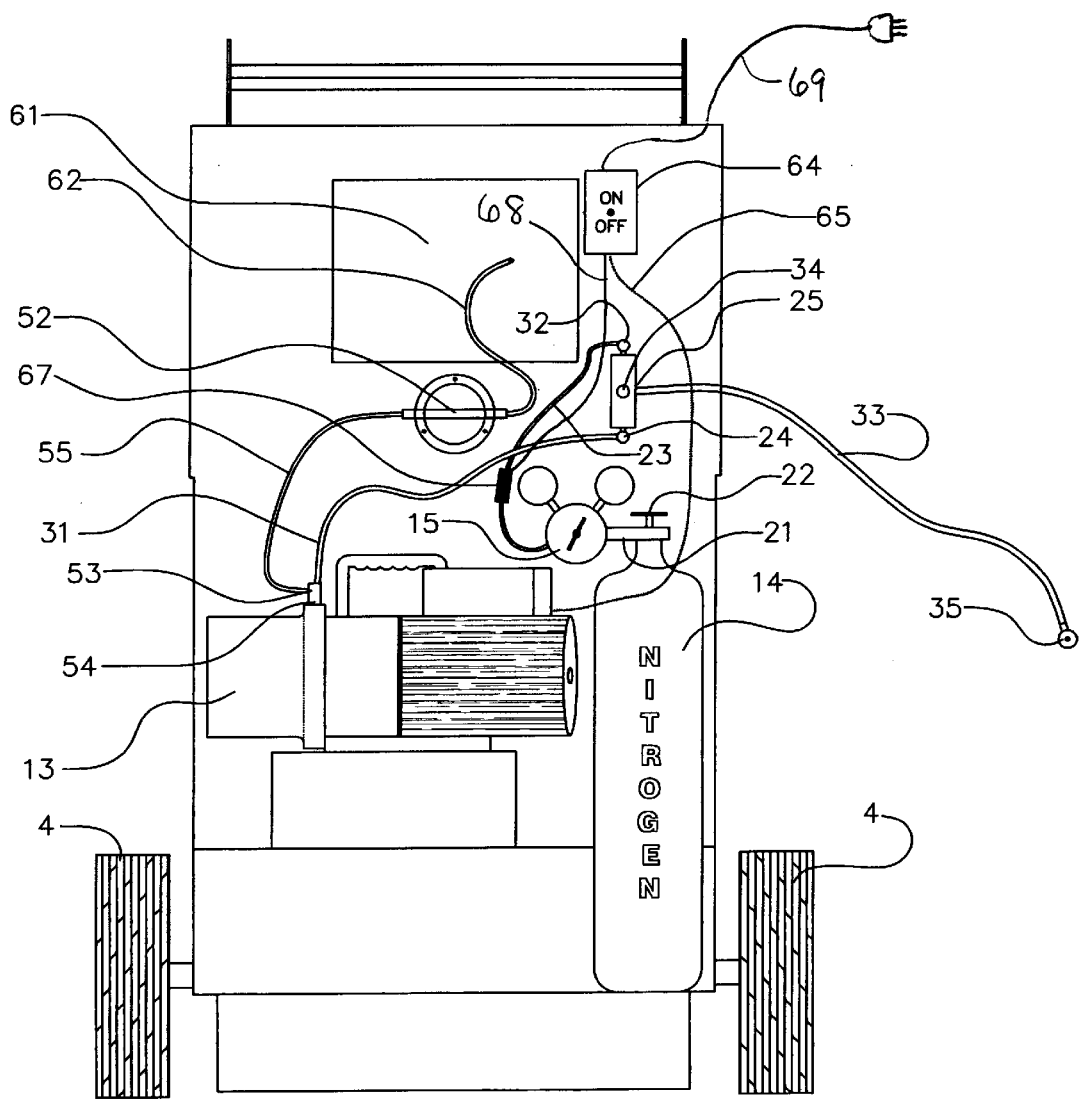
FIG. 3 is a front elevational view of the tire evacuation and inflation apparatus of FIG. 1, with the outer housing removed to reveal the component parts thereof.

Referring to the drawings, and particularly FIGS. 1–3, a tire evacuation and inflation apparatus is illustrated and generally indicated at 1. The tire evacuation and inflation apparatus 1 includes a housing 2 mounted on an axle 3 with a pair of wheels 4 attached thereto. The housing 2 includes a handle 5 on the rear thereof which allows the housing 2 to be easily tilted backward such that the weight of the apparatus 1 is resting on the wheels 4. A lid 6 is hingedly attached to the housing 2 such that the lid 6 can be lifted upward to reveal the interior of the housing 2. A pedestal 7 is attached to the bottom of the housing 2 and extends across the width thereof to provide stable support, when coupled with the wheels 4, for the housing 2. A side door 11 is hingedly attached to the housing 2 in an opening 12 which provides a convenient access to a vacuum pump 13 positioned in the housing 2. A tank 14 containing a quantity of pressurized, dried and purified gas, such as nitrogen, sulfur hexafluoride or argon is also positioned within the housing 2. A pressure regulator 15 is attached to an outlet 21 of the tank 14 which outlet is opened and closed via a hand operated valve 22. A nitrogen supply hose 23 is connected between the regulator 15 and a first outer leg 24 of a three way ball valve 25. A vacuum hose 31 is connected between the vacuum pump 13 and a second outer leg 32 of the three way ball valve 25. A first end of a tire supply hose 33 is attached to a middle leg 34 of the ball valve 25 with the second end being attached to a standard spring closed tire valve chuck 35. A handle 36 is attached to a shaft 39, which shaft 39 is attached to a diverter ball 40 of the ball valve 25, as is better illustrated in FIG. 4. The shaft 39 preferably extends through the lid 6 of the housing 2 with the handle 36 positioned on the outside of the lid 6 to provide convenient control of the valve 25. Indicia 41 including the word "Nitrogen" and the word "Vac" are provided on the exterior of the lid 6 proximate respective opposing sides of the handle 36 to indicate the condition of the three way ball valve 25 as controlled by the handle 36. In other words, when the handle 36 is turned to the "Vac" position, the ball valve 25 connects the vacuum hose 31 to the supply hose 33. Conversely, when the handle 36 is turned to the "Nitrogen" position, the ball valve 25 connects the nitrogen supply hose 23 to the supply hose 33.

Figure 4:
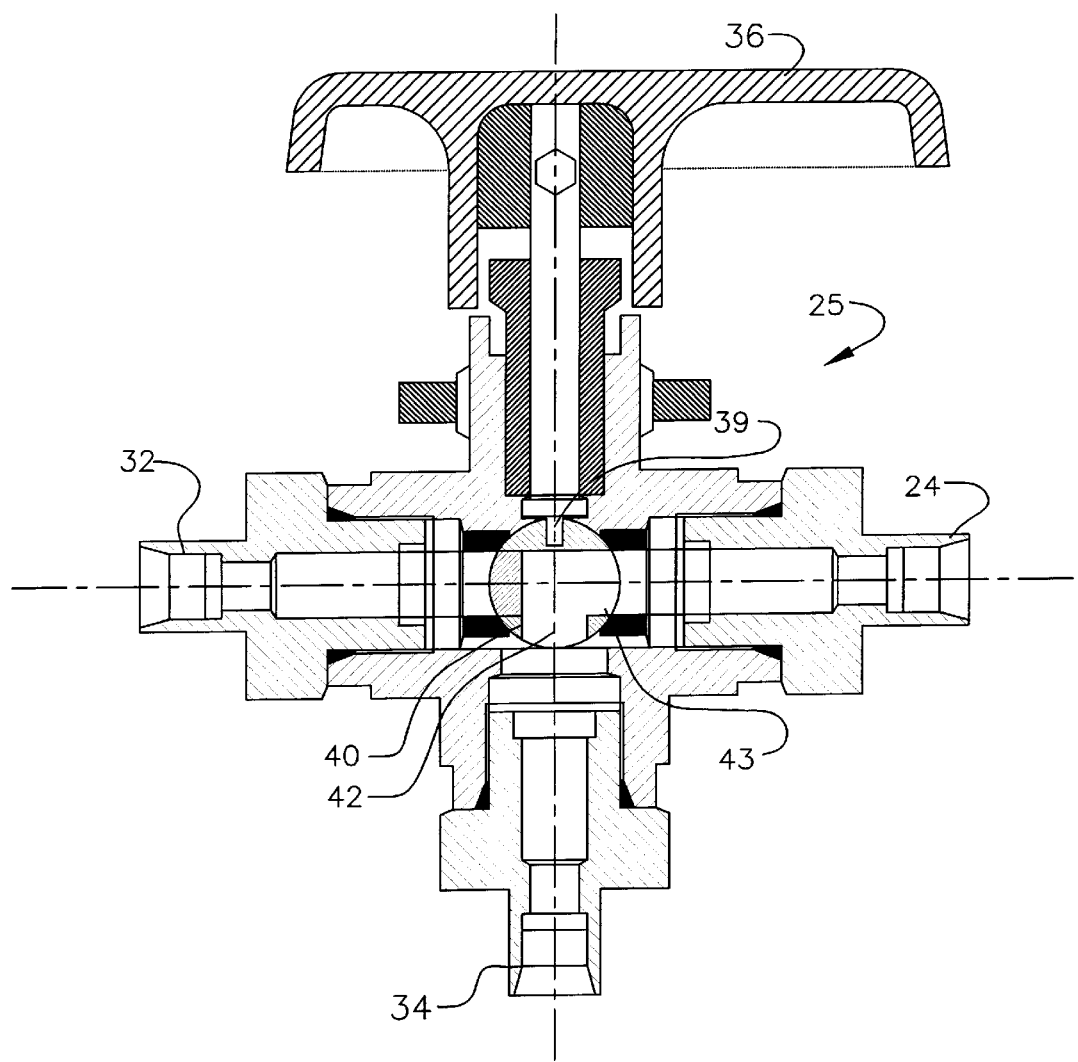
FIG. 4 is a cross-sectional view of a three way ball valve used in the tire evacuation and inflation apparatus of FIG. 1.

The three way ball valve 25 is best illustrated in cross-section in FIG. 4. The valve 25 includes the handle 36 attached to the shaft 39, which is, in turn, rigidly attached to the diverter ball 40. The diverter ball 40 includes an L shaped channel therein with a vertical leg 42 which is constantly attached to the middle leg 34 (which is attached to the tire supply hose 33) and a horizontal leg 43 which, depending upon the position of the handle 36, is selectively attached to the first outside leg 24 (which is attached to the nitrogen supply hose 23) or to the second outside leg 32 (which is attached to the vacuum hose 31).

A vacuum gauge 52 is attached to an inlet 53 of the vacuum pump 13 via a T fitting 54 and a gauge hose 55. The vacuum gauge 52 has an indicator dial 56 positioned on the upper outside surface of the lid 5. A micron gauge 61 is also attached to the inlet 53 of the vacuum pump 13 via a hose 62 placed in series with the vacuum gauge 52. The micron gauge 61 has a digital read-out panel 63 positioned in the lid 5 which is visible from outside the housing 2. A remote on-off switch 64 is attached to the vacuum pump 13 via a power supply cable 65 and the switch 64 is attached to and extends upward from the housing lid 5 to make it accessible from outside the housing 2.

A heater or heat exchanger 67 is mounted to the nitrogen supply hose 23 such that the pressurized nitrogen gas passes through the heater 67. The heater 67 is preferably a resistance type gas heater such as a 1000 watt heater with a built in internal thermostat. The heater 67 is electrically connected by an electrical cable 68 to a power supply cord 69 through the junction box for the switch 64. However, the electrical cable 68 is not connected to switch 64, but is connected directly to power supply cord 69 such that there is always a live connection to the heater 67 once the power supply cord 69 is plugged in. The electrical cable 65 for the vacuum pump 13 is connected to the power supply cord 69 through the on-off switch 64.

The heater 67 may comprise a plurality of resistance type heaters in series to increase the heating capacity of the system. The heater or heat exchanger 67 may also comprise a tube and fin type heat exchanger across which ambient air is blown to use ambient heat to heat the cooled nitrogen toward ambient conditions.

Operation

A tire (not shown) to be inflated, is first seated on a wheel rim by being inflated with compressed ambient air in a well know manner. Depending upon the type of tire, the tire is either seated on the wheel by pressure on a peripheral "bead" which engages a groove in the wheel, or, in the case of some racing and high performance applications, the tire may actually be bolted to the wheel rim to prevent slippage. In either case, the inflated, seated tire is then deflated in a standard method, either by removing the Schrader valve from the tire valve stem, or holding the Schrader valve open with some type of tool. Once deflated, the tire remains filled with a quantity of ambient air at atmospheric pressure. The Schrader valve, if removed, is then replaced.

The tire evacuation and inflation apparatus 1 is then attached to the tire valve stem by connecting the chuck 35 to the tire valve stem. The vacuum pump 13 is then started by turning on the switch 64 and the valve handle 36 is turned to the "Vac" position. A vacuum is then drawn on the tire, which vacuum is monitored via the vacuum gauge 52 and dial 56 and the micron gauge digital readout panel 63.

The vacuum gauge 52 is a bourdon tube type instrument which measures vacuum in inches of Mercury. The micron vacuum gauge 61, an instrument commonly used in refrigeration, uses a thermocouple probe positioned with a vacuum hose, such as the hose 31 which thermocouple is heated to a set temperature. The thermocouple is then cooled by fluid flow within the vacuum hose and its temperature is interpreted and indicated as a micron flow level. As the tire is evacuated, the micron reading decreases proportionately to reduced air density through the vacuum line.

As the vacuum pump 13 is run, the tire is drawn into a "deep vacuum" which is defined as less than 27 inches of Mercury. Experimentation has revealed that typical radial and bias ply tires can be drawn down to just above 50 microns, or very near a complete vacuum, while large dragster rear bias ply tires, which are more prone to leakage due to large, thin sidewalls, can usually be drawn down to about 110–120 microns. As the internal pressure within the tire reaches a level below 27 inches of Mercury, any moisture remaining within the tire will vaporize (or sublimate, in the case of ice) and be evacuated from the tire.

The valve handle 36 is then switched from "Vac" to "Nitrogen" without removing the chuck 35 from the tire valve stem. Nitrogen (or another suitable pressurized gas) is then supplied to the tire via the nitrogen supply hose 23, the valve 25 and the tire supply hose 33. The regulator 15 is preferably set to supply nitrogen to pressurize the tire to the desired internal tire pressure, such as, e.g., 32 psi for a standard passenger tire or 6 to 7 psi for the large bias ply rear tires used on dragsters. The regulator 15 is preferably set at a pressure considerably higher than the desired internal tire pressure to ensure that the tire will inflate relatively rapidly to the desired pressure. The pressure in the tire can be measured with a conventional tire gauge once the tire is inflated to determine when the desired internal pressure is achieved.

The pressure drop of the nitrogen as it passes through valve 25 causes the temperature of the nitrogen flowing into the nitrogen supply hose 23 to drop considerably. The nitrogen is heated as it flows through the heater 67. The heater 67 is selected to heat the nitrogen passing therethrough to at least ambient temperature. The heater 67 may also be selected or the thermostat set to heat the gas passing therethrough to a temperature which exceeds the ambient temperature and/or which approaches or equals the temperature which the gas within the tire will reach during normal operation of the vehicle. The pressure of the gas within the tire will change with changes in temperature of the gas. If the tire is filled to a recommended pressure with cooled nitrogen (or other gas utilized) which has not been heated as noted above, the tire pressure will subsequently increase as the temperature of the nitrogen rises to ambient temperature and will further increase during operation of the vehicle resulting in overinflation of the tire.

In a preferred embodiment, the temperature as well as the pressure are selectively controllable to fill the tire to a predetermined pressure at a predetermined temperature to minimize the problems associated with over and under inflation of the tires due to changes in the tire pressure as the temperature of the gas in the tires changes during use.

The tire is thus inflated by the nitrogen tank 14 and regulator 15 to a preferred tire pressure at a preferred temperature, thus yielding a tire which is inflated solely with a purified, dried gas, such as nitrogen. The tire, thus inflated, will not be subject to the wide swings in tire pressure with temperature exhibited by tires inflated by traditional methods.

In one version of the apparatus 1, the vacuum pump 13 was a RobinAir #15000 with a 6 CFM rating, the three way ball valve 25 was a Parker #6F-B8XJ2-SSP; the micron gauge 61 was a JB Industries, Inc. #DV20 Electronic Vacuum Gauge; the nitrogen tank was a standard #40 tank and the vacuum gauge was a CBM #LF25S-1FF.

While the evacuation and inflation method has been described herein as being directed to pneumatic tires, other inflatable devices can benefit from it as well. For example, inflatable sporting goods, such as footballs, volley balls, tennis balls, basketballs, etc. can be first evacuated and then filled with nitrogen to minimize the effects of temperature variation on internal pressure. Therefore, the claims should not be exclusively limited to the use of the method in tires, unless specifically stated therein.

While certain forms of the present invention have bene illustrated and described herein, it is not to be limited to the specific forms or arrangement of parts described and shown. For example, the specific arrangement of vacuum pump, nitrogen tank and ball valve can be varied considerably. The ball valve can have outer legs arrayed at 90 degrees from each other, or any other suitable orientation, rather than 180 degrees found in the illustrated valve. Although the invention has been described above with reference to nitrogen as the gas utilized to fill the tires it is to be understood that other types of dried, purified gases can be used as well. For the purpose of this application an inert gas shall generally be considered any gas which is generally chemically unreactive, non-combustible, non-flammable and non-corrosive. Other changes will occur to those of skill in the art. It is thus to be understood that while certain forms of the present invention have been illustrated and described herein, it is not to be limited to the specific forms or arrangement described and shown.

What is claimed and desired to be secured by Letters Patent is as follows:

1. A pneumatic tire evacuation and inflation apparatus, comprising:
   (a) a three way valve including first and second valve openings which are selectively and alternatively connectable with a third valve opening;
   (b) a tank of pressurized inert gas having an outlet flow connected to said first valve opening by a first conduit;
   (c) a vacuum pump having an inlet flow connected to said second valve opening by a second conduit;
   (d) a hose flow connected at one end to said third valve opening and at an opposite end to a tire valve chuck; and
   (e) a heat exchanger connected to said first conduit or said hose for heating pressurized gas flowing therethrough from said tank.

2. The tire evacuation and inflation apparatus as in claim 1 wherein said heat exchanger is connected to said first conduit.

3. The tire evacuation and inflation apparatus as in claim 1 further comprising
   (a) a vacuum gauge connected to said vacuum pump inlet, said vacuum gauge including a gauge readout.

4. The tire evacuation and inflation apparatus as in claim 1 wherein said heat exchanger is a resistance heater including a thermostat set at a preselected temperature.

5. A pneumatic tire evacuation and inflation apparatus as in claim 1 wherein said heater is capable of heating said pressurized gas to a temperature at least approaching a temperature said pressurized gas will reach in said tire during normal operation of a vehicle to which said tire is secured.

6. A method of evacuating and inflating a pneumatic tire comprising the steps of:
   (a) attaching a first end of a supply hose to a valve stem on the tire;
   (b) connecting a second end of the supply hose to a vacuum pump;
   (c) operating said vacuum pump until the tire is evacuated to a vacuum of at least 27 inches of mercury;
   (d) disconnecting said second end of said supply hose from said vacuum pump and connecting it to a tank of pressurized inert gas without allowing ambient air to enter the tire; and
   (e) supplying pressurized inert gas from said tank to said tire through said supply hose to inflate the tire to a desired internal pressure and heating said pressurized inert gas as it passes from said tank to said tire.

7. The method as in claim 6 further comprises heating said pressurized inert gas to at least ambient temperature before supplying said pressurized inert gas to said tire.

8. The method as in claim 6 further comprising heating said pressurized inert gas, before supplying said pressurized inert gas to said tire, to at least a temperature said pressurized gas will reach in said tire during normal operation of a vehicle to which said tire is secured.

* * * * *